US010715648B1

(12) United States Patent
Vashisht et al.

(10) Patent No.: US 10,715,648 B1
(45) Date of Patent: Jul. 14, 2020

(54) USER INTERFACE FOR VIRTUAL ASSISTANT INTERACTIONS ON TELEPHONY DEVICE

(71) Applicant: Cisco Technology, Inc., San Jose, CA (US)

(72) Inventors: Vikas Vashisht, Morrisville, NC (US); Qian Yu, San Francisco, CA (US); Kalyan Chakravarthy Dasari, Murphy, TX (US); Alberto J. Montilla Bravo, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/408,206

(22) Filed: May 9, 2019

(51) Int. Cl.
*H04M 1/247* (2006.01)
*G10L 15/26* (2006.01)
*H04M 7/00* (2006.01)

(52) U.S. Cl.
CPC ......... *H04M 1/2471* (2013.01); *G10L 15/265* (2013.01); *H04M 7/0033* (2013.01); *H04M 2250/60* (2013.01)

(58) Field of Classification Search
CPC .............. H04M 1/2471; H04M 7/0033; H04M 2250/60; G10L 15/265
See application file for complete search history.

(56) References Cited

U.S. PATENT DOCUMENTS

| 7,636,349 | B2 | 12/2009 | Pearce et al. |
| 8,243,895 | B2 | 8/2012 | Jain et al. |
| 8,767,925 | B2 * | 7/2014 | Sureka ................ H04L 12/1822 345/473 |
| 9,088,600 | B2 | 7/2015 | Linton et al. |
| 9,160,848 | B2 * | 10/2015 | Kim ..................... H04M 3/4936 |
| 9,318,108 | B2 | 4/2016 | Gruber et al. |
| 9,386,152 | B2 | 7/2016 | Riahi et al. |
| 2007/0133776 | A1 * | 6/2007 | Jain ................... H04M 3/42331 379/231 |
| 2008/0069325 | A1 * | 3/2008 | King ..................... H04M 1/006 379/157 |
| 2013/0040615 | A1 * | 2/2013 | Sawhney ................ H04W 4/50 455/414.1 |
| 2018/0020093 | A1 * | 1/2018 | Bentitou ............. H04M 3/4365 |
| 2019/0007806 | A1 * | 1/2019 | Chu ........................ H04W 4/16 |
| 2019/0075506 | A1 * | 3/2019 | Coglon ................. H04W 76/10 |

* cited by examiner

*Primary Examiner* — Stella L. Woo
(74) *Attorney, Agent, or Firm* — Merchant & Gould P.C.

(57) ABSTRACT

A user interface for virtual assistant interactions on a telephony device may be provided. First, a plurality of lines associated with the telephony device, including a designated line for a user and a shared line for a virtual assistant, may be displayed through the user interface. Next, in response to receiving an incoming call to the designated line, a plurality of features associated with handling the incoming call, including an assistant feature to direct the incoming call to the virtual assistant, may be displayed through the user interface. Then, in response to the incoming call being directed to the virtual assistant, a plurality of features associated with managing a conversation between the virtual assistant and a caller during the incoming call may be displayed through the user interface. After the incoming call has ended, a call history associated with the incoming call may be displayed through the user interface.

20 Claims, 8 Drawing Sheets

US 10,715,648 B1

USER INTERFACE FOR VIRTUAL ASSISTANT INTERACTIONS ON TELEPHONY DEVICE

TECHNICAL FIELD

The present disclosure relates generally to the field of telecommunications, and more specifically to a user interface on a telephony device that facilitates interactions with a virtual assistant.

BACKGROUND

Virtual assistants may be software-based agents that perform tasks or services for users based on commands received via devices in which the virtual assistants have been integrated. With the continued advances in artificial intelligence (AI), virtual assistants have become increasingly popular because it has become easier for users to engage in natural conversations with the virtual assistants to manage complex actions and tasks. However, virtual assistants have not been employed ubiquitously across all device types, and particularly have not been integrated into more traditional devices, such as telephony devices.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
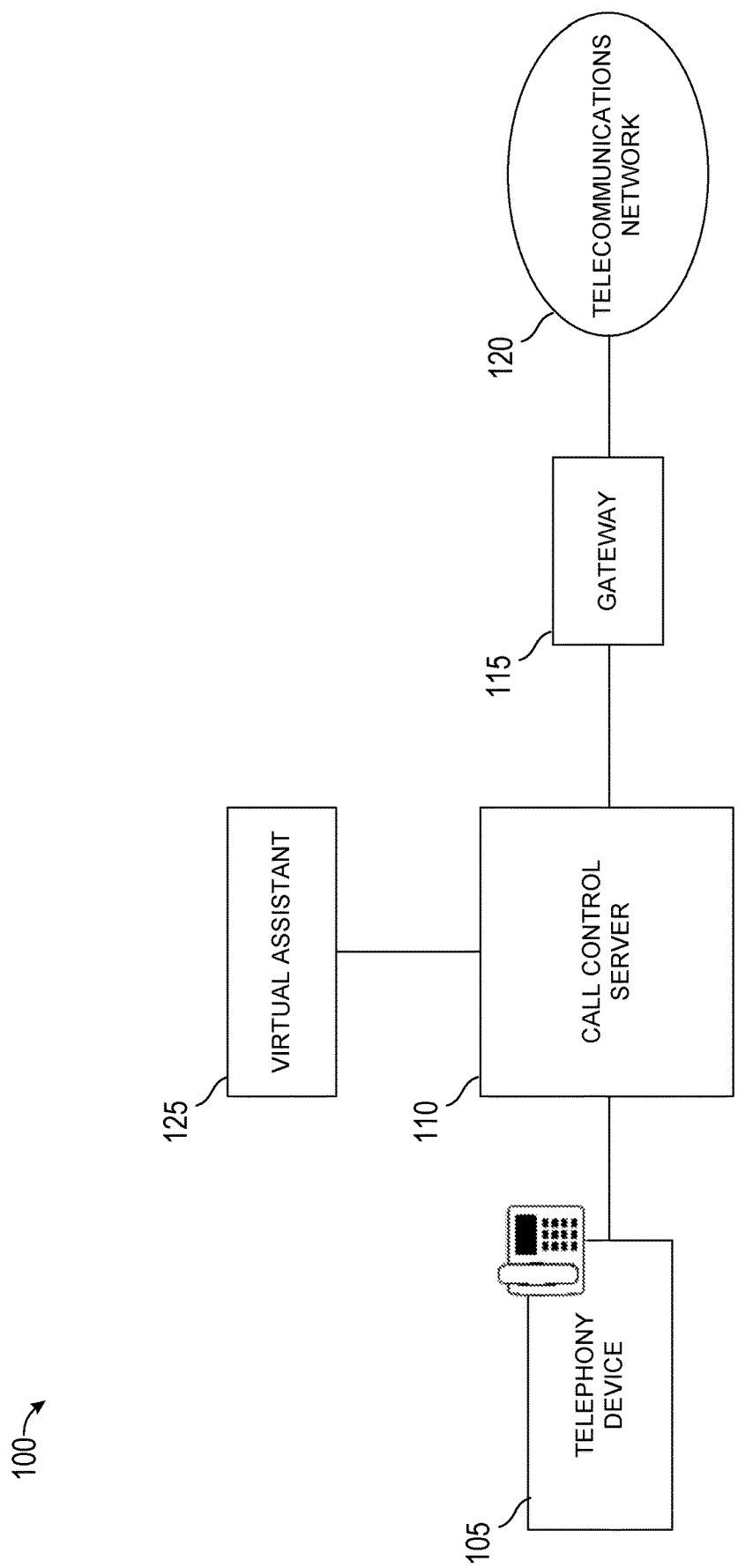
FIG. 1 shows an operating environment for integrating functionalities of a virtual assistant with existing functionalities of a telephony device.

A user interface for virtual assistant interactions on a telephony device may be provided. First, a plurality of lines associated with the telephony device, including a designated line for a user and a shared line for a virtual assistant, may be displayed through the user interface. Next, in response to receiving an incoming call to the designated line, a plurality of features associated with handling the incoming call, including an assistant feature to direct the incoming call to the virtual assistant, may be displayed through the user interface. Then, in response to the incoming call being directed to the virtual assistant, a plurality of features associated with managing a conversation between the virtual assistant and a caller during the incoming call may be displayed through the user interface. After the incoming call has ended, a call history associated with the incoming call may be displayed through the user interface.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

With the advances in artificial intelligence (AI), it has become increasingly easier for users to engage in natural conversations with virtual assistants to manage complex actions and tasks. However, virtual assistants have not yet been employed ubiquitously across all device types, and particularly have not been integrated into more traditional devices, such as telephony devices. Telephony devices may facilitate communication between two or more users, and may be associated with a plurality of lines, including designated and shared lines.

Embodiments of the disclosure provide a user interface on a display of a telephony device that seamlessly integrates functionalities of a virtual assistant with existing functionalities of the telephony device. For example, the user interface may display a shared line through which the user may interact with the virtual assistant on the telephony device. Additionally, the user interface may provide a plurality of features associated with screening an incoming call, managing conversations between the virtual assistant and a caller when the virtual assistant handles the incoming call on behalf of the user, and providing a call history following completion of an incoming call.

FIG. 1 shows an operating environment 100 for integrating functionalities of a virtual assistant with existing functionalities of a telephony device. As shown in FIG. 1, operating environment 100 may comprise a telephony device 105, a call control server 110, a gateway 115, a telecommunications network 120, and a virtual assistant 125.

Telephony device 105, may be any device capable of facilitating voice communication between two or more users. In some examples, telephony device 105 may be a telephone, as illustrated. In other examples, telephony device 105 may be a computing device, such as a mobile phone, a laptop, a tablet, a desktop computer or a wearable computing device, among other similar computing devices. In some embodiments, the type of device may be dependent on a type of telephony utilized for the voice communication (e.g., digital telephony vs. Internet Protocol (IP) telephony).

Telephony device 105 may be associated with a plurality of lines, including at least one line designated for the user of telephony device 105 and one or more shared lines. A shared line may be a line shared between telephony device 105 and one or more other devices that enables each device on the shared line to receive, answer, and/or transfer an incoming call to another device on the shared line.

In some embodiments, a display of telephony device 105 may be a traditional screen (e.g., a non-touch screen), and the user may interact with a user interface of the display using a combination of soft keys and hard keys of telephony device 105. Soft keys may be dynamic, changeable keys that enable the user to customize the user interface depending on a context and/or preferences of the user. For example, soft keys may have two components. A first component may be text in the user interface indicating a function of the soft key, and a second component may be a physical button on telephony device 105 underneath the text which the user may press to invoke the soft key. In other embodiments, the display of telephony device 105 may be a touch screen, and in addition to utilizing soft keys and hard keys of telephony device 105, the user may interact with user interface of the display using touch or stylus input.

Telephony device 105 may receive an incoming call from or place an outgoing call to another telephony device associated with another user. In some examples, call control server 110 may receive the incoming call from telecommunications network 120 via gateway 115 and route the incoming call to telephony device 105 to establish a connection between the two telephony devices. Similarly, call control server 110 may receive the outgoing call from telephony device 105 and route the outgoing call via gateway 115 to telecommunications network 120 for transmission to the other telephony device to establish a connection between the two telephony devices. Once the connection has been established, call control server 110 may monitor and maintain the connection throughout a duration of the incoming or outgoing call.

In some embodiments, telecommunications network 120 may be a public switched telephone network (PSTN) comprising one or more of telephone lines, fiber optic cables, microwave transmission links, cellular networks, communications satellites, and undersea telephone cables, interconnected by a plurality of switching centers. Accordingly, gateway 115 may be a public switched telephone network (PSTN) gateway. In other embodiments, telecommunications network 120 may be the Internet (e.g., if IP telephony is utilized).

Virtual assistant 125 may be a software-based agent that performs tasks or services for a user based on received user commands. Virtual assistant 125 may be integrated with telephony device 105, and presented as a shared line of telephony device 105 through the user interface. In some embodiments, virtual assistant 125 may be remotely stored and executed on a cloud-based server. In other embodiments, virtual assistant 125 may be locally stored and executed on telephony device 105.

In some embodiments, virtual assistant 125 may handle incoming calls on behalf of the user of telephony device 105. For example, if virtual assistant 125 is remote, call control server 110 may redirect the incoming call from telephony device 105 to the cloud-based server to be handled by virtual assistant 125. If virtual assistant 125 is local, telephony device 105 may locally terminate media associated with the incoming call and connect the incoming call to virtual assistant 125. Additional tasks and services specific to telephony device 105 that may be performed by virtual assistant 125 include transcribing a conversation between virtual assistant 125 and a caller, capturing one or more tasks from the conversation and performing the captured tasks, and creating a call history.

In other embodiments, further tasks and services not specific to telephony device 105 may also be performed by virtual assistant 125. For example, the user may interact with virtual assistant 125 to ask questions or request for tasks to be performed, such as to determine an upcoming schedule of the user or request scheduling of a meeting, among other examples.

The elements described above of operating environment 100 (e.g., telephony device 105, call control server 110, gateway 115, telecommunications network 120, and virtual assistant 125) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 8, the elements of operating environment 100 may be practiced in a computing device 800.

Figure 2:
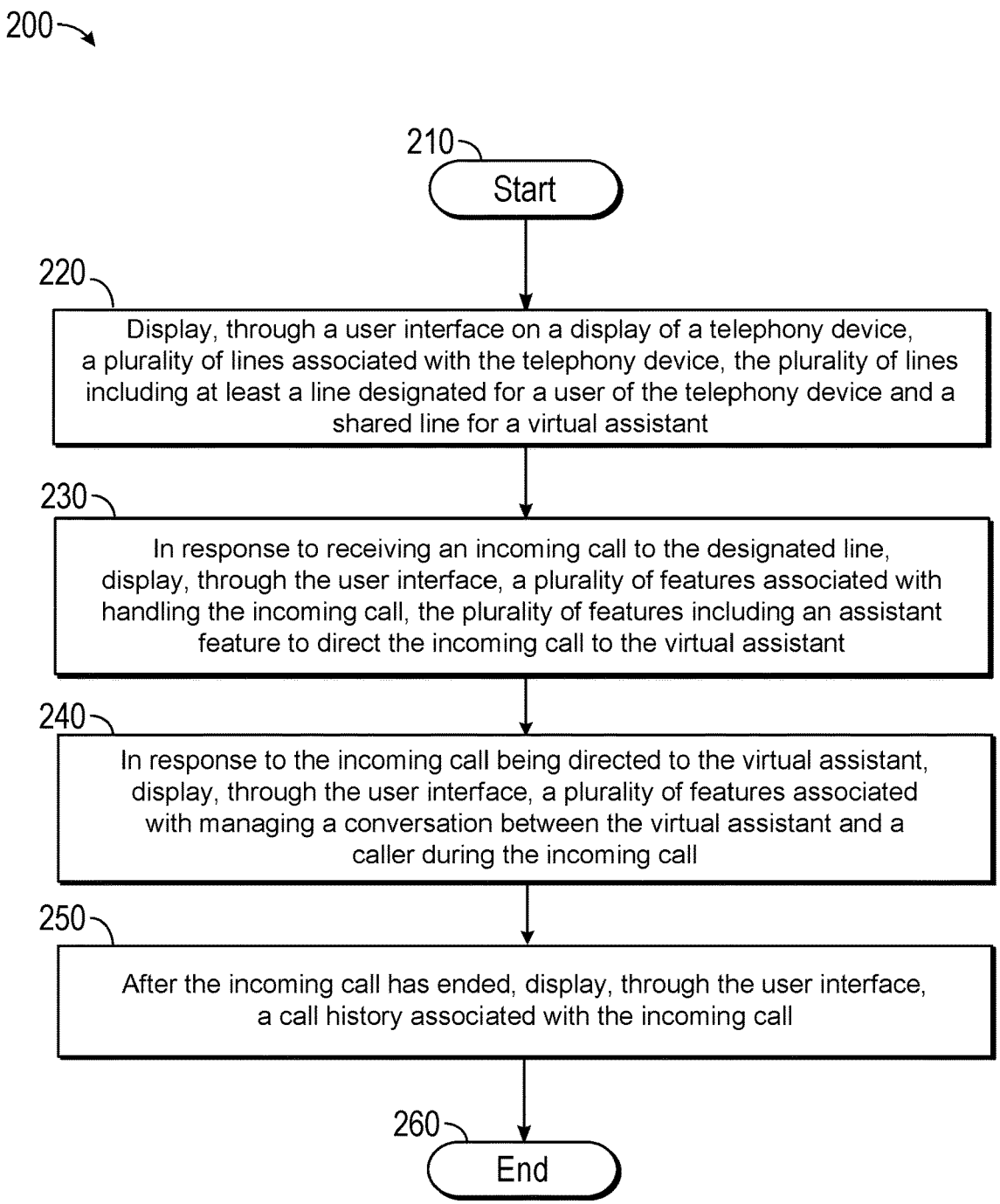
FIG. 2 is a flow chart of a method for providing a user interface for virtual assistant interactions on a telephony device.

FIG. 2 is a flow chart setting forth the general stages involved in a method 200 consistent with embodiments of the disclosure for providing a user interface for virtual assistant interactions on telephony device 105. Method 200 may be implemented within an operating environment, such as operating environment 100 described in FIG. 1, in which functionalities of virtual assistant 125 are integrated with existing functionalities of telephony device 105.

Figure 3:
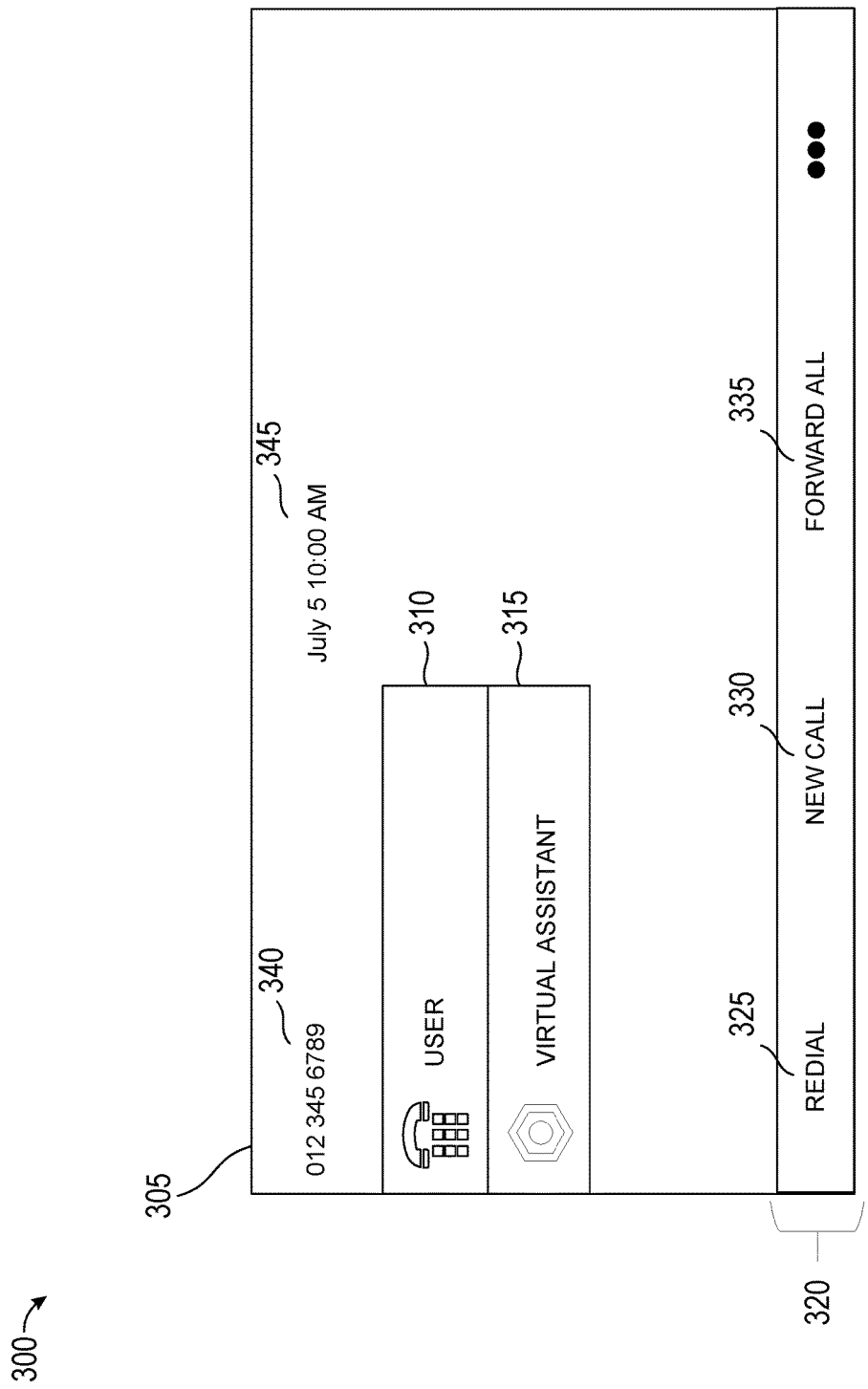
FIG. 3 is an example user interface configuration for interacting with a virtual assistant on a telephony device.

Method 200 may begin at starting block 210 and proceed to stage 220 where a plurality of lines associated with telephony device 105 may be displayed through a user interface on the display of telephony device 105, as illustrated in FIG. 3. The displayed plurality of lines may include a line designated for the user of telephony device 105 and a shared line for virtual assistant 125. In some embodiments, an interaction between the user and virtual assistant 125 may be initiated in response to receiving the user's selection of the shared line and/or in response to the user going off-hook on the shared line.

Figure 4:
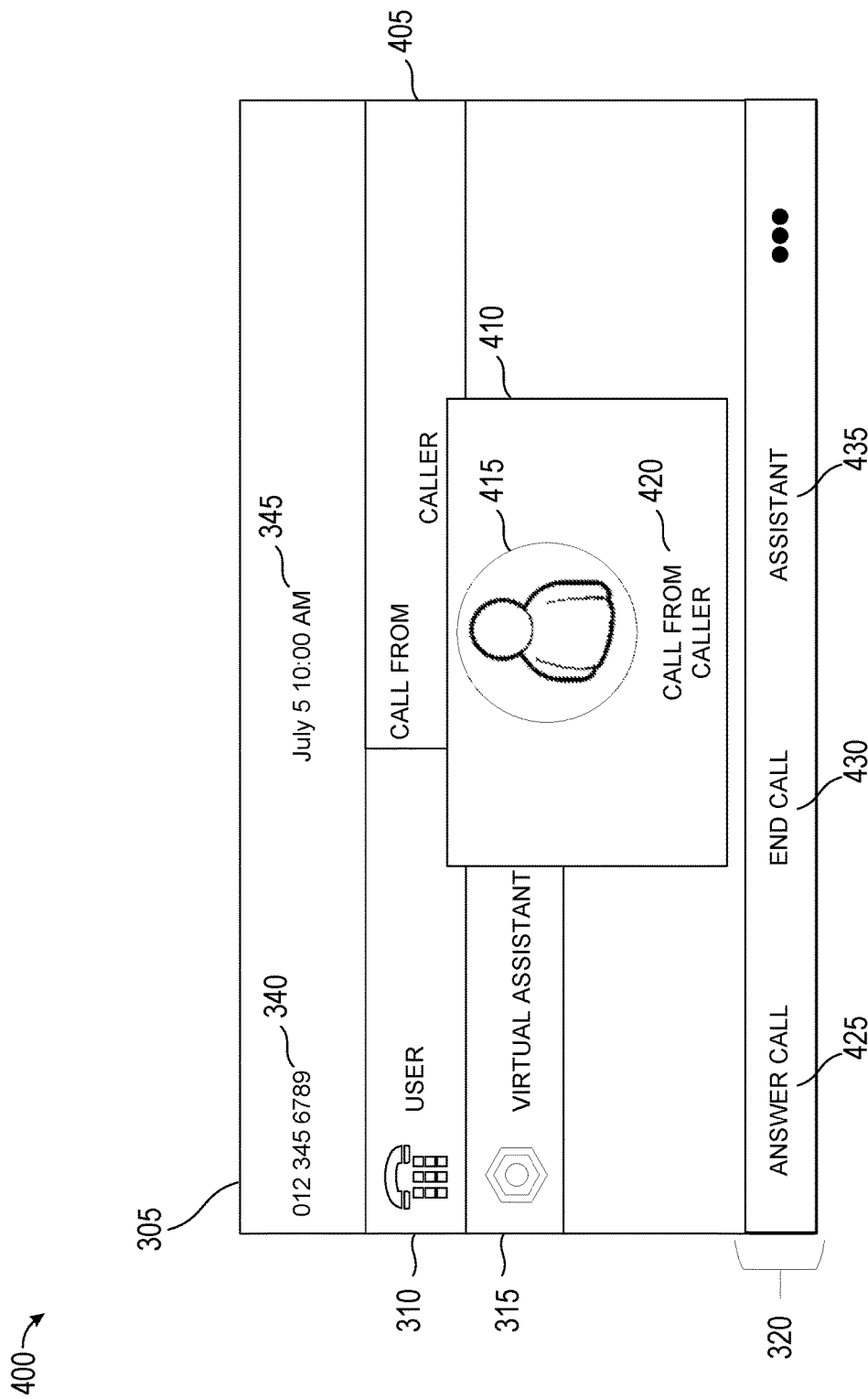
FIG. 4 is an example user interface configuration for screening an incoming call.

As the lines are being displayed through the user interface at stage 220, and in response to receiving an incoming call to the designated line, method 200 may proceed to stage 230 where a plurality of features associated with handling the incoming call are displayed through the user interface, as illustrated in FIG. 4. The features associated with handling the incoming call may include an assistant feature to direct the incoming call to virtual assistant 125. In some examples, the incoming call may be directed to virtual assistant 125 upon selection of the assistant feature. In other examples, the incoming call may be directed to virtual assistant 125 automatically in response to one or more predefined rules being met.

The features associated with handling the incoming call may also include an answer feature and an end call feature. The answer feature enables the user to personally handle the incoming call upon selection, and the end call feature ends the incoming call upon selection. The user may select the end call feature as an initial selection to immediately end the incoming call or as a subsequent selection following an initial selection of the answer feature.

In some embodiments, as the incoming call is being received and the features associated with handling the incoming call are displayed, a representation of the incoming call may be displayed adjacent to the designated line through the user interface. In additional embodiments, a notification may also be displayed through the user interface. The notification may include a graphical and/or textual representation of the caller, which may help inform the user of which feature to select to handle the incoming call.

Figure 5:
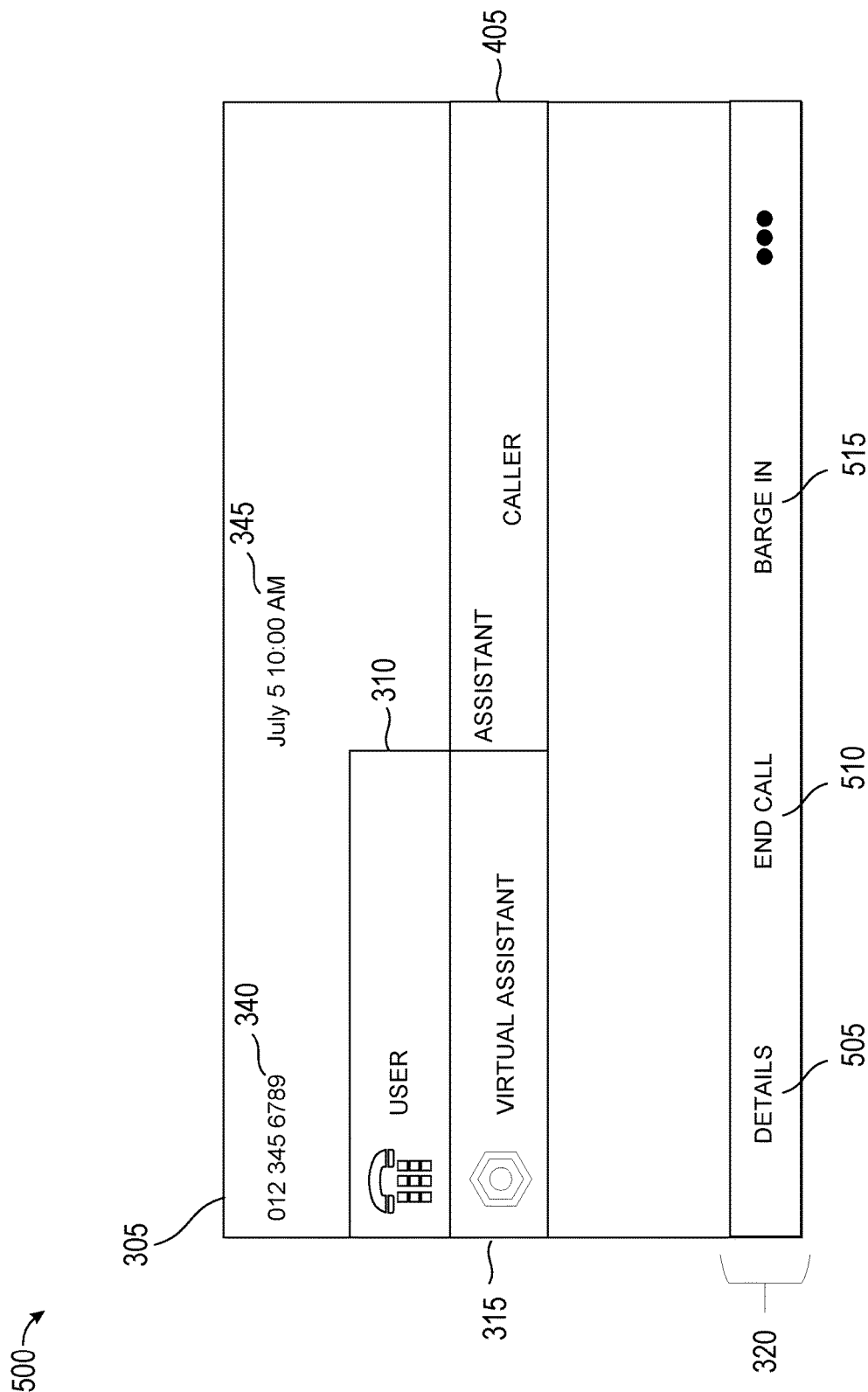
FIG. 5 is an example user interface configuration for managing an active conversation between a virtual assistant and a caller.

Once the features associated with handling the incoming call have been displayed at stage 230, and in response to the incoming call being directed to virtual assistant 125, method 200 may proceed to stage 240 where a plurality of features associated with managing a conversation between virtual assistant 125 and a caller during the incoming call may be displayed through the user interface, as illustrated in FIG. 5. The features associated with managing the conversation may include a details feature, a barge in feature and an end call feature. Upon selection of the respective features, the details feature may display a transcription of the conversation, the barge in feature may place the user into conference with virtual assistant 125 and the caller, and the end call feature may end the incoming call between virtual assistant 125 and the caller. Additionally, in some examples, once the incoming call has been directed to the virtual assistant, the representation of the incoming call previously displayed adjacent to the designated line may now be displayed adjacent to the shared line to indicate virtual assistant 125 is actively in the conversation with the caller.

Figure 7:
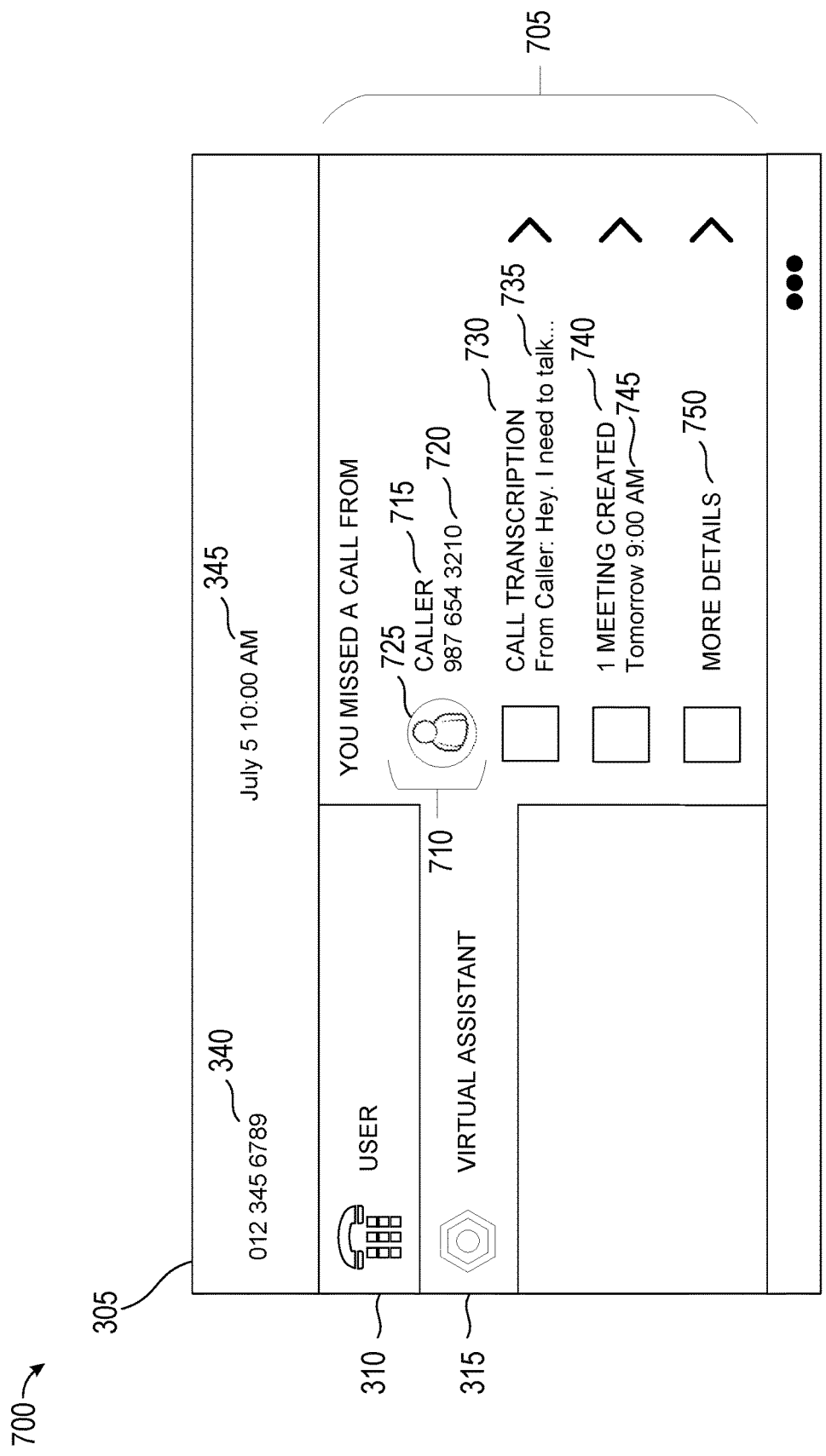
FIG. 7 is an example user interface configuration for displaying a call history for a conversation held between a virtual assistant and a caller.

Following display of the plurality of features associated with managing the conversation at stage 240, and after the incoming call has ended, method 200 may proceed to stage 250 where a call history associated with the incoming call may be displayed through the user interface, as illustrated in FIG. 7. The call history may include contact information associated with the caller, a transcription of the conversation, and/or one or more actions captured from the conversation and performed by virtual assistant 125. Once the call history is displayed at stage 250, method 200 may then end at stage 260.

FIG. 3 is an example configuration 300 of a user interface 305 for interacting with virtual assistant 125 on telephony device 105. User interface 305 may be presented through the display of telephony device 105, where the display may be a traditional screen (e.g., a non-touch screen) or a touch screen, as discussed in detail in FIG. 1 above.

User interface 305 may display a plurality of lines associated with telephony device 105. Line 310, hereinafter referred to as designated line 310, may be a line designated for the user of telephony device 105. Line 315, hereinafter referred to as shared line 315, may be a shared line added for virtual assistant 125. A shared line enables any of two or more devices sharing that line to receive, answer, and/or transfer an incoming call to another device on the shared line. Display of shared line 315 through user interface 305 may indicate to the user that virtual assistant 125 is available for the user to interact with.

The user may initiate an interaction with virtual assistant 125 in several ways. In one embodiment, the user may select shared line 315. If the display is a traditional screen, the user may select shared line 315 using a soft key. For example, the user may press a physical button located adjacent to the user interface 305 indicating presence of shared line 315. If the display is a touch screen, the user may select shared line 315 by touching via a finger or stylus a respective area associated with shared line 315 on user interface 305, or may also use a soft key, if available.

In another embodiment, the user may go off-hook on shared line 315 to interact with virtual assistant 125. The user may go off-hook when an action is performed that causes shared line 315 to transition to a state that allows dialing and transmission, but prohibits incoming calls from being answered. For example, dependent on a type of telephony device 105, the user may go off-hook by lifting a handset off a base of telephony device 105, by beginning to dial, and/or by selecting a feature associated with placing an outgoing call, among other examples. In some embodiments, a feature on shared line 315 may be implemented so that when the user goes off-hook, telephony device 105 immediately dials a preconfigured number to connect an audio path to virtual assistant 125. The user may then interact with virtual assistant 125 with voice. For example, user may ask virtual assistant 125 questions or request tasks or services to be performed, such as to provide the user's upcoming schedule or set up a meeting.

Additionally, virtual assistant 125 may be able to perform various features associated with telephony device 105 on behalf of the user. For example, virtual assistant 125 may handle incoming calls on behalf of the user, provide real-time transcriptions of conversations of incoming calls handled by virtual assistant 125, capture and perform actions during incoming calls, and provide call histories, among other features discussed in greater detail below.

User interface 305 may also display one or more features 320 of telephony device 105. Features 320 displayed may be dependent on a context of interaction with telephony device 105. For example, features 320 displayed may be different depending on a type of interaction (e.g., placing outgoing call, receiving incoming call, looking at a call history). As illustrated in FIG. 3, features 320 may include a redial feature 325, a new call feature 330, and a forward all feature 335, among other similar features. Redial feature 325 may enable the user to automatically call a last number that was dialed on telephony device 105, which may save the user time and energy in having to remember and/or look up the last number and redial manually. New call feature 330 may enable the user to enter a new telephone number or a new phone or video address to place an outgoing call. Forward all feature 335 may enable the user to forward all incoming calls to another telephony device.

If the display is a traditional screen, features 320 may be soft keys, where text indicating each feature is displayed in user interface (e.g., redial feature 325, new call feature 330, and forward all feature 335), and the user may select a corresponding physical button underneath the display on telephony device 105 to invoke each feature. If the display is a touch screen, the user may invoke features 320 by touching (e.g., tapping, sliding, etc.) via a finger or stylus a respective area associated with each feature on user interface 305.

User interface 305 may also display other useful details, such as a phone number 340 associated with telephony device 105 (e.g., a phone number associated with designated line 310), and a date and time 345.

FIG. 4 is an example configuration 400 of user interface 305 for screening an incoming call. User interface 305 may be presented through the display of telephony device 105, where the display may be a traditional screen (e.g., a non-touch screen) or a touch screen, as discussed in detail in FIG. 1 above.

In response to telephony device 105 receiving an incoming call to the user's designated line, user interface 305 may display a representation of the incoming call 405 adjacent to designated line 310. Additionally, user interface 305 may display a notification 410 that provides an image 415 of the caller, if available, and text 420 indicating who is calling.

Based on the context (e.g., receiving the incoming call), features 320 displayed by user interface 305 may include features associated with handling of the incoming call. For example, features may include an answer call feature 425, an end call feature 430, and an assistant feature 435. Answer call feature 425 may enable the user to handle the incoming call via designated line 310 through telephony device 105. End call feature 430 may enable the user to end the incoming call as an initial action (e.g., ignore the incoming call) or end the incoming call subsequent to the user's selection of the answer call feature 425. In some examples, if the end call feature 430 is selected as the initial action, the incoming call may be forwarded to a voicemail of the user. Assistant feature 435 may enable the user to direct the incoming call to virtual assistant 125 to handle via shared line 315.

If the display is a traditional screen, features 320 may be soft keys, where text indicating each feature is displayed in user interface 305 (e.g., answer call feature 425, end call feature 430, and assistant feature 435), and the user may select a corresponding physical button underneath the display on telephony device 105 to invoke each feature. If the display is a touch screen, the user may invoke features 320 by touching (e.g., tapping, sliding, etc.) via a finger or stylus a respective area associated with each feature on user interface 305.

As described above, the user may manually direct the incoming call to virtual assistant 125 by selecting assistant feature 435. In additional embodiments, incoming calls may be automatically directed to virtual assistant 125 based on one or more predefined rules. The predefined rules may be based on an identity of the caller, a day or time of day, or an availability of the user (e.g., a calendar of the user), among other similar factors. In one example, all unknown callers may be automatically directed to virtual assistant 125. In another example, all incoming calls after a particular time on weekdays and at any time on weekends may be automatically directed to virtual assistant 125. In further example, if the user's calendar indicates he or she is busy for a particular time block, any incoming calls during the time block may be automatically directed to virtual assistant 125.

FIG. 5 is an example configuration 500 of user interface 305 for managing an active conversation between virtual assistant 125 and the caller. User interface 305 may be presented through a display of telephony device 105, where the display may be a traditional screen (e.g., a non-touch screen) or a touch screen, as discussed in detail in FIG. 1 above Upon receiving the incoming call, if the user manually selects assistant feature 435 or one or more predefined rules are met as described above in FIG. 4, the incoming call may be directed to virtual assistant 125 to connect the caller with virtual assistant 125. If virtual assistant 125 is remote, the incoming call may be redirected from telephony device 105 to the cloud-based server storing and executing virtual assistant 125. If virtual assistant 125 is local, telephony device 105 may locally terminate media associated with the incoming call and connect the incoming call to virtual assistant 125.

Once connected, virtual assistant 125 may engage the caller in a conversation. Correspondingly, user interface 305 may display a representation of the incoming call 405 adjacent to shared line 315 to indicate virtual assistant 125 is in an active conversation with the caller, and display features 320 that are associated with managing the conversation. For example, features 320 may include a details feature 505, an end call feature 510, and a barge in feature 515.

Details feature 505, as described in greater detail in FIG. 6 below, may enable the user to view a transcription of the conversation in real-time. End call feature 510 may enable the user to end the incoming call between virtual assistant 125 and the caller. Barge in feature 515 may enable the user to interrupt the conversation between virtual assistant 125 and the caller. For example, the user may be viewing the transcription of the conversation provided by details feature 505, and determine he or she needs to intervene. When the user intervenes, user, caller, and virtual assistant 125 may be placed into conference. Virtual assistant 125 may continue to transcribe the conversation, capture and perform actions during the conversation, and develop a call history for the conversation that may include the transcription and any captured actions, as described in greater detail in FIG. 6 and FIG. 7 below.

If the display is a traditional screen, features 320 may be soft keys, where text indicating each feature is displayed in user interface (e.g., details feature 505, end call feature 510, and barge in feature 515), and the user may select a corresponding physical button underneath the display on telephony device 105 to invoke each feature. If the display is a touch screen, the user may invoke features 320 by touching (e.g., tapping, sliding, etc.) via a finger or stylus a respective area associated with each feature on user interface 305.

Figure 6:
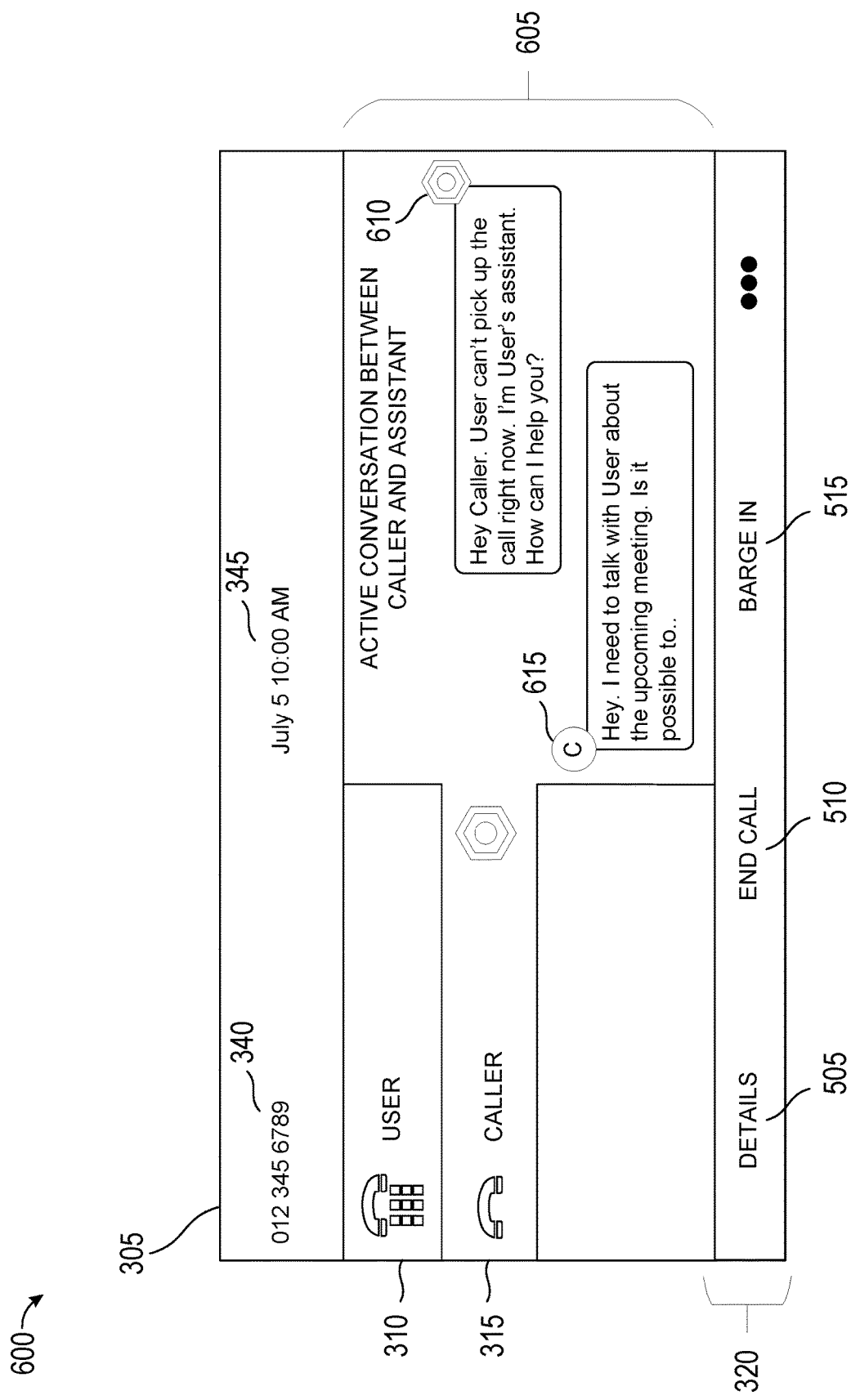
FIG. 6 is an example user interface configuration for displaying a transcription of an active conversation between a virtual assistant and a caller.

FIG. 6 is an example configuration 600 of user interface 305 for displaying a transcription 605 of the conversation between virtual assistant 125 and the caller. User interface 305 may be presented through a display of telephony device 105, where the display may be a traditional screen (e.g., a non-touch screen) or a touch screen, as discussed in detail in FIG. 1 above.

If the user selects details feature 505 described above in FIG. 5 while virtual assistant 125 is in an active conversation with the caller, user interface 305 may display transcription 605 of the conversation. To generate transcription 605, speech recognition processes may be implemented to convert speech recorded from the conversation to text. Icons may be displayed in conjunction with the text of transcription 605 to distinguish portions of the conversation associated with virtual assistant 125 (e.g., speech from virtual assistant 125) and portions of the conversation associated with the caller (e.g., speech from caller). For example, icon 610 may be associated with virtual assistant 125, and icon 615 may be associated with the caller. Depending on a length of the conversation and a size of the display of the telephony device 105, a scrolling feature may be provided through user interface 305 such that the user may scroll through transcription 605.

In some embodiments, speech-to-text conversion may occur in real-time, and transcription 605 may be displayed and continuously updated through user interface 305 throughout a duration of the conversation. Therefore, the user may view the conversation in real time, and determine whether and when to intervene using barge in feature 515, for example.

In addition to transcription 605, user interface 305 may continue to display features 320 that may be associated with managing the conversation, such as details feature 505, end call feature 510, and barge in feature 515 as described above in FIG. 5. In some examples, details feature 505 may be visually represented in a unique manner from end call feature 510 and barge in feature 515 to indicate details feature 505 has been selected. For example, details feature 505 may be highlighted, shaded, underlined, displayed in a different color or font, or animated, among other similar visual effects.

FIG. 7 is an example configuration 700 of user interface 305 for displaying a call history 705 for the conversation held between virtual assistant 125 and the caller. User interface 305 may be presented through a display of telephony device 105, where the display may be a traditional screen (e.g., a non-touch screen) or a touch screen, as discussed in detail in FIG. 1 above.

Once the conversation between virtual assistant 125 and the caller has ended, user interface 305 may display call history 705 for the conversation. In some embodiments, user interface 305 may automatically display call history 705 once the incoming call between virtual assistant 125 and the caller has ended. In other embodiments, user interface 305 may display call history 705 in response to the user initiating an interaction with virtual assistant 125, as described in FIG. 3 above, subsequent to the termination of the incoming call between virtual assistant 125 and the caller.

Call history 705 may include the caller's contact information 710, including the caller's name 715, the caller's phone number 720, and the caller's image 725, if available. Call history 705 may also include a plurality of selectable options. A first option 730 may be to view transcription 605, where a preview 735 of transcription 605 may also be provided. When first option 730 is selected, an entirety of transcription 605 may be presented, similar to transcription 605 in configuration 600.

A second option 740 may be to view one or more actions captured and performed by virtual assistant 125 throughout the conversation, where action details 745 may also be provided. Example actions may include to set up a meeting, leave a notification, and set up reminders, among other similar actions. To provide an example scenario, during the conversation, the caller may indicate their desire to meet with the user. As virtual assistant 125 is continuing the conversation with the caller, virtual assistant 125 may schedule a meeting on behalf of the user based on a known calendar of the user and the conversation with the caller. Selection of second option 740 may allow the user to view the meeting created in more detail, while action details 745 may provide a date and time of the meeting.

A third option 750 may be to view more details. These additional details may include information such as whether the call was automatically or manually directed to virtual assistant 125, whether the user intervened in the call, which party ended the call (e.g., the caller or the user), and a length of the conversation, among other similar information.

The example user interface configurations provided above in FIG. 3 through FIG. 7 are for illustrative purposes only, and are not intended to be limiting. Additional or alternative textual schemes, graphical schemes, audio schemes, animation schemes, coloring schemes, highlighting schemes, and/or shading schemes may be utilized to enhance the display of the user interface configurations According to some example embodiments, a plurality of lines associated with a telephony device may be displayed through a user interface on a display of the telephony device. The displayed plurality of lines may include at least a designated line for a user of the telephony device and a shared line for a virtual assistant. In response to receiving an incoming call to the designated line, a plurality of features associated with handling the incoming call may be displayed through the user interface. The displayed plurality of features may include an assistant feature to direct the incoming call to the virtual assistant. In response to the incoming call being directed to the virtual assistant, a plurality of features associated with managing a conversation between the virtual assistant and a caller during the incoming call may be displayed through the user interface. After the incoming call has ended, a call history associated with the incoming call may be displayed through the user interface.

In other example embodiments, the incoming call may be directed to the virtual assistant in response to receiving a selection of the assistant feature, or the incoming call may be directed to the virtual assistant in response to determining one or more predefined rules for automatically directing the incoming call to the virtual assistant are met. Displaying the plurality of features associated with managing the conversation may include displaying a details feature, a barge in feature, and/or an end call feature. A selection of the details feature may be received, and a transcription of the conversation may be displayed through the user interface, where the transcription may be generated using speech recognition to convert speech recorded from the conversation to text. A selection of the barge in feature may be received, and the user may be placed into conference with the virtual assistant and the caller to allow the user to intervene in the conversation. A selection of the end call feature may be received, and the incoming call may be ended between the virtual assistant and the caller.

In further example embodiments, displaying the plurality of features associated with handling the incoming call may include displaying an answer feature that enables the user to handle the incoming call upon selection, and displaying an end call feature that ends the incoming call upon selection. The user may be enabled to select the end call feature as an initial selection or as a subsequent selection following an initial selection of the answer feature. An interaction may be initiated between the user and the virtual assistant in response to receiving a selection of the shared line from the user through the user interface or in response to the user going off-hook on the shared line.

According to other example embodiments, an apparatus may include a display, a memory storage, and a processing unit coupled to the memory storage. The processing unit may be operative to display, through a user interface on the display, a plurality of lines associated with the apparatus. The displayed plurality of lines may include at least a designated line for a user of the apparatus and a shared line for a virtual assistant. In response to receiving an incoming call to the designated line, the processing unit may be operative to display, through the user interface, a plurality of features associated with handling the incoming call. The displayed plurality of features may include an assistant feature to direct the incoming call to the virtual assistant. In response to the incoming call being directed to the virtual assistant, the processing unit may be operative to display, through the user interface, a plurality of features associated with managing a conversation between the virtual assistant and a caller during the incoming call. After the incoming call has ended, the processing unit may be operative to display, through the user interface, a call history associated with the incoming call.

According to further example embodiments, a computer-readable storage medium may have instructions stored thereon that include displaying, through a user interface on a display of a telephony device, a plurality of lines associated with the telephony device. The displayed plurality of lines may include at least a designated line for a user of the telephony device and a shared line for a virtual assistant. The instructions may also include displaying, through the user interface, a plurality of features associated with handling an incoming call in response to receiving the incoming call to the designated line. The displayed plurality of features may include an assistant feature to direct the incoming call to the virtual assistant. The instructions may further include displaying, through the user interface, a plurality of features associated with managing a conversation between the virtual assistant and a caller during the incoming call in response to the incoming call being directed to the virtual assistant. The instructions may yet further include displaying, through the user interface, a call history associated with the incoming call after the incoming call has ended.

Figure 8:
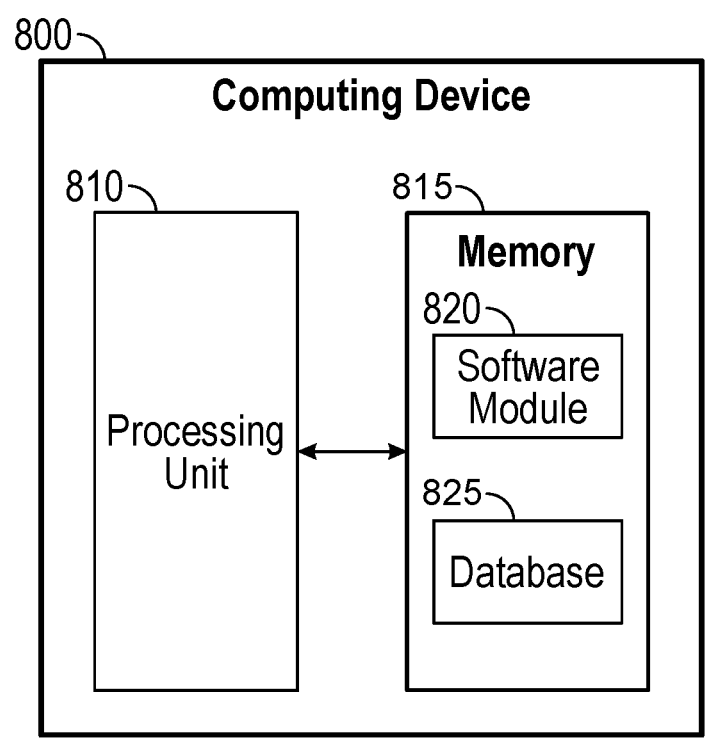
FIG. 8 is a block diagram of a computing device.

FIG. 8 shows computing device 800. As shown in FIG. 8, computing device 800 may include a processing unit 810 and a memory unit 815. Memory unit 815 may include a software module 820 and a database 825. While executing on processing unit 810, software module 820 may perform, for example, processes for providing a user interface for virtual assistant interactions on a telephony device, including for example, any one or more of the stages from method 200 described above with respect to FIG. 2. Computing device 800, for example, may provide an operating environment for elements of operating environment 100 including, but not limited to, telephony device 105, call control server 110, gateway 115, telecommunications network 120, and virtual assistant 125. Elements of operating environment 100 (e.g., telephony device 105, call control server 110, gateway 115, telecommunications network 120, and virtual assistant 125) may operate in other environments and are not limited to computing device 800.

Computing device 800 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 800 may comprise any computer operating environment, such as hand-held devices, multi-processor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples and computing device 800 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application featureality all of which may be integrated (or "burned") onto the chip substrate as a single integrated circuit. When operating via a SOC, the featureality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The features/acts noted in the blocks may occur out of the order as shown in any flowchart. For example, two blocks shown in succession may in fact be executed substantially concurrently or the blocks may sometimes be executed in the reverse order, depending upon the featureality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   displaying, through a user interface on a display of a telephony device, a plurality of lines associated with the telephony device, the displayed plurality of lines including at least a designated line for a user of the telephony device and a shared line for a virtual assistant, wherein the virtual assistant is integrated with the telephony device and is presented as the shared line of the telephony device;
   in response to receiving an incoming call to the designated line, displaying, through the user interface, a plurality of features associated with handling the incoming call, the displayed plurality of features including an assistant feature to direct the incoming call to the virtual assistant;
   in response to the incoming call being directed to the virtual assistant, displaying, through the user interface, a plurality of features associated with managing a conversation between the virtual assistant and a caller during the incoming call; and
   after the incoming call has ended, displaying, through the user interface, a call history associated with the incoming call.

2. The method of claim 1, wherein the incoming call is directed to the virtual assistant in response to one of:
   receiving a selection of the assistant feature; and
   determining one or more predefined rules for automatically directing the incoming call to the virtual assistant are met.

3. The method of claim 1, wherein displaying the plurality of features associated with managing the conversation comprises displaying one or more of a details feature, a barge in feature, and an end call feature.

4. The method of claim 3, further comprising:
   receiving a selection of the details feature; and
   displaying, through the user interface, a transcription of the conversation, the transcription generated using speech recognition to convert speech recorded from the conversation to text.

5. The method of claim 3, further comprising
   receiving a selection of the barge in feature; and
   placing the user into conference with the virtual assistant and the caller to allow the user to intervene in the conversation.

6. The method of claim 3, further comprising:
   receiving a selection of the end call feature; and
   ending the incoming call between the virtual assistant and the caller.

7. The method of claim 1, wherein displaying the plurality of features associated with handling the incoming call through the user interface comprises:
   displaying an answer feature that enables the user to handle the incoming call upon selection.

8. The method of claim 7, wherein displaying the plurality of features associated with handling the incoming call through the user interface comprises:
   displaying an end call feature that ends the incoming call upon selection, wherein the user is enabled to select the end call feature as an initial selection or as a subsequent selection following an initial selection of the answer feature.

9. The method of claim 1, further comprising:
   initiating an interaction between the user and the virtual assistant in response to one of:
      receiving a selection of the shared line; and
      the user going off-hook on the shared line.

10. An apparatus comprising:
    a display;
    a memory storage; and
    a processing unit coupled to the memory storage, wherein the processing unit is operative to:
       display, through a user interface on the display, a plurality of lines associated with the apparatus, the displayed plurality of lines including at least a designated line for a user of the apparatus and a shared line for a virtual assistant, wherein the virtual assistant is integrated with the telephony device and is presented as the shared line of the telephony device;
       in response to receiving an incoming call to the designated line, display, through the user interface, a plurality of features associated with handling the incoming call, the displayed plurality of features including an assistant feature to direct the incoming call to the virtual assistant;
       in response to the incoming call being directed to the virtual assistant, display, through the user interface, a plurality of features associated with managing a conversation between the virtual assistant and a caller during the incoming call; and
       after the incoming call has ended, display, through the user interface, a call history associated with the incoming call.

11. The apparatus of claim 10, wherein the plurality of features associated with managing the conversation include:
    a details feature that displays a transcription of the conversation upon selection;
    a barge in feature that places the user into conference with the virtual assistant and the caller upon selection; and
    an end call feature that ends the incoming call between the virtual assistant and the user upon selection.

12. The apparatus of claim 11, wherein when the user is placed into conference with the virtual assistant and the caller, the virtual assistant actively listens to a remainder of the conversation to one or more of transcribe the remainder of the conversation and capture and perform one or more actions.

13. The apparatus of claim 11, wherein one or more of the displayed plurality of lines, the displayed plurality of features associated with handling the incoming call, and the displayed plurality of features associated with managing the conversation are displayed as soft keys of the apparatus.

14. The apparatus of claim 11, wherein the display is a touchscreen, and one or more of the displayed plurality of lines, the displayed plurality of features associated with handling the incoming call, and the displayed plurality of features are selectable on the user interface via touch input.

15. The apparatus of claim 10, wherein to display the call history, the processing unit is operative to display one or more of:
    contact information associated with the caller;
    a transcription of the conversation; and
    one or more actions captured from the conversation and performed by the virtual assistant.

16. The apparatus of claim 10, wherein the virtual assistant is remotely stored and executed on a cloud-based server.

17. The apparatus of claim 10, wherein the virtual assistant is locally stored and executed on the apparatus.

18. A non-transitory computer-readable storage medium having instructions stored thereon comprising:
- displaying, through a user interface on a display of a telephony device, a plurality of lines associated with the telephony device, the displayed plurality of lines including at least a designated line for a user of the telephony device and a shared line for a virtual assistant, wherein the virtual assistant is integrated with the telephony device and is presented as the shared line of the telephony device;
- in response to receiving an incoming call to the designated line, displaying, through the user interface, a plurality of features associated with handling the incoming call, the displayed plurality of features including an assistant feature to direct the incoming call to the virtual assistant;
- in response to the incoming call being directed to the virtual assistant, displaying, through the user interface, a plurality of features associated with managing a conversation between the virtual assistant and a caller during the incoming call; and
- after the incoming call has ended, displaying, through the user interface, a call history associated with the incoming call.

19. The non-transitory computer-readable storage medium of claim 18, further comprising:
- in response to receiving the incoming call to the designated line, displaying, through the user interface, a representation of the incoming call adjacent to the displayed designated line and a notification, wherein the notification include one or more of a graphical and textual representation of the caller.

20. The non-transitory computer-readable storage medium of claim 19, further comprising:
- in response to the incoming call being directed to the virtual assistant, displaying, through the user interface, the representation of the incoming call adjacent to the displayed shared line to indicate the virtual assistant is actively in the conversation with the caller.

* * * * *